(12) United States Patent
Davis et al.

(10) Patent No.: US 9,153,349 B2
(45) Date of Patent: Oct. 6, 2015

(54) METHOD FOR RECYCLING NUCLEAR CONTROL RODS AND RECYCLED CONTROL ROD SECTION

(75) Inventors: Wesley Davis, Forest, VA (US); Brett Matthews, Lynchburg, VA (US)

(73) Assignee: AREVA Inc., Lynchburg, VA (US)

( * ) Notice: Subject to any disclaimer, the term of this patent is extended or adjusted under 35 U.S.C. 154(b) by 748 days.

(21) Appl. No.: 13/417,771

(22) Filed: Mar. 12, 2012

(65) Prior Publication Data

US 2013/0235967 A1   Sep. 12, 2013

(51) Int. Cl.
| | | |
|---|---|---|
| *G21C 19/00* | (2006.01) | |
| *G21C 21/18* | (2006.01) | |
| *G21D 1/00* | (2006.01) | |
| *G21C 19/34* | (2006.01) | |
| *G21F 9/30* | (2006.01) | |

(52) U.S. Cl.
CPC ............... *G21C 21/18* (2013.01); *G21C 19/34* (2013.01); *G21D 1/003* (2013.01); *G21F 9/30* (2013.01); *Y02W 30/881* (2015.05)

(58) Field of Classification Search
CPC .................................. G21D 1/003; G21F 9/00
USPC ...................... 376/333, 266; 423/111, 99, 23; 420/461, 505, 506, 525; 30/35, 40.1, 30/494, 109, 92–108
See application file for complete search history.

(56) References Cited

U.S. PATENT DOCUMENTS

| | | | | |
|---|---|---|---|---|
| 2,051,199 | A * | 8/1936 | Christianson | 30/320 |
| 3,731,381 | A * | 5/1973 | Penfield et al. | 30/124 |
| 4,172,762 | A * | 10/1979 | Anthony et al. | 376/327 |
| 4,325,785 | A * | 4/1982 | Klotz et al. | 376/154 |
| 4,326,919 | A | 4/1982 | Hill | |
| 4,383,394 | A | 5/1983 | Qurnell et al. | |
| 4,624,827 | A * | 11/1986 | Doshi et al. | 376/333 |
| 4,627,163 | A * | 12/1986 | Cuba et al. | 30/95 |
| 4,650,606 | A | 3/1987 | Yamamoto | |
| 4,699,756 | A * | 10/1987 | Nguyen | 376/333 |
| 4,820,478 | A * | 4/1989 | Freeman | 376/333 |
| 4,928,291 | A | 5/1990 | Mouesca et al. | |
| 5,183,626 | A | 2/1993 | Denizou | |
| 6,405,441 | B1 * | 6/2002 | Rucker | 30/179 |
| 2009/0268860 | A1 | 10/2009 | Lu | |
| 2013/0074302 | A1 * | 3/2013 | Davin | 29/401.1 |

FOREIGN PATENT DOCUMENTS

| | | |
|---|---|---|
| JP | 08-043594 | 2/1996 |
| KR | 20060027472 | 3/2006 |

OTHER PUBLICATIONS

Claus, W.D. Radiation Biology and Medicine, Chapter 19, 1958.*
US EPA Website, Feb. 2, 2011.*
PCT International Search Report for corresponding International Application PCT/US2013/030103.

* cited by examiner

*Primary Examiner* — Jack W Keith
*Assistant Examiner* — Sharon M Davis
(74) *Attorney, Agent, or Firm* — Davidson, Davidson & Kappel, LLC

(57) ABSTRACT

A method for recycling AgInCd control rod absorber bar material from a used control rod from a nuclear power plant includes sectioning AgInCd absorber bar from a used control rod into a first section and a second section, the first section having a higher radioactivity than the second section; and recycling the material of the second section of the AgInCd absorber bar.

19 Claims, 6 Drawing Sheets

METHOD FOR RECYCLING NUCLEAR CONTROL RODS AND RECYCLED CONTROL ROD SECTION

The present invention relates generally to nuclear reactors and more specifically to control rods for a nuclear reactor.

BACKGROUND

Controls rods are used in nuclear reactors to control the rate of fission. In pressurized water reactors (PWRs), the control rods typically are arranged in control rod clusters. As shown in FIG. 1, each control rod cluster 10 can include a spider 12 with the control rods 14 vertically extending downwardly from the spider 12. The control rods 14 have a cladding 16, typically made of stainless steel or Ni-based alloy, fastened to the spider 12. The cladding 16 can have a bottom end cap 20 and a top end cap 22 to define a cavity 18. The cavity 18 is filled with one or more absorber bars 30, which are typically cylindrical and held by mean of a spring 24. The absorber bars for the control rod for a PWR often are made of silver, indium and cadmium, AgInCd. Absorber pellets, made for instance of $B_4C$, may be interposed between the absorber bar 30 and the spring 24. The control rod cluster 10 can be lowered via the spider 12 into guide thimbles of the fuel assembly of a PWR to regulate the reactivity of the nuclear reactor core. During nuclear power reactor operation, the neutrons penetrate the control rod cluster 10 and the absorber bar material is activated and transmuted to other elements. The activation level depends on the accumulated irradiation of the material and the bottom section of the absorber bar 30 nearest the bottom end cap 20 introduced more deeply in the reactor core than the top section, has the highest neutron-activated radioactivity.

U.S. Pat. Nos. 4,928,291, 5,183,626 and 5,889,832 describe control rod clusters and are hereby incorporated by reference herein.

U.S. Pat. No. 4,650,606 describes cutting off used poison rods secured to a holder by a cutter and then storing them in a storage container.

U.S. Pat. No. 4,383,394 describes a cutting device for irradiated components such as nuclear fuel assembly parts.

Korean Patent Application Abstract 2006-0027472 describes an apparatus for automatically cutting a nuclear fuel control rod using a plurality of cutters that can reduce the time required for cutting the nuclear fuel control rod.

Japanese Patent Application No. 06-182414 describes a nuclear reactor spent guide tube cutting device.

SUMMARY OF THE INVENTION

An object of the present invention is to permit recycling of absorber bar material from control rods.

The present invention provides a method for recycling AgInCd control rod absorber bar material from a used control rod comprising an AgInCd absorber bar, the method comprising: sectioning the AgInCd absorber bar from a used control rod into a first section and a second section, the first section having a higher radioactivity than the second section; and recycling the material of the second section of AgInCd absorber bar.

The present invention will be described schematically with respect to two preferred embodiments in which the control rod is sectioned into the two sections.

Figure 1:
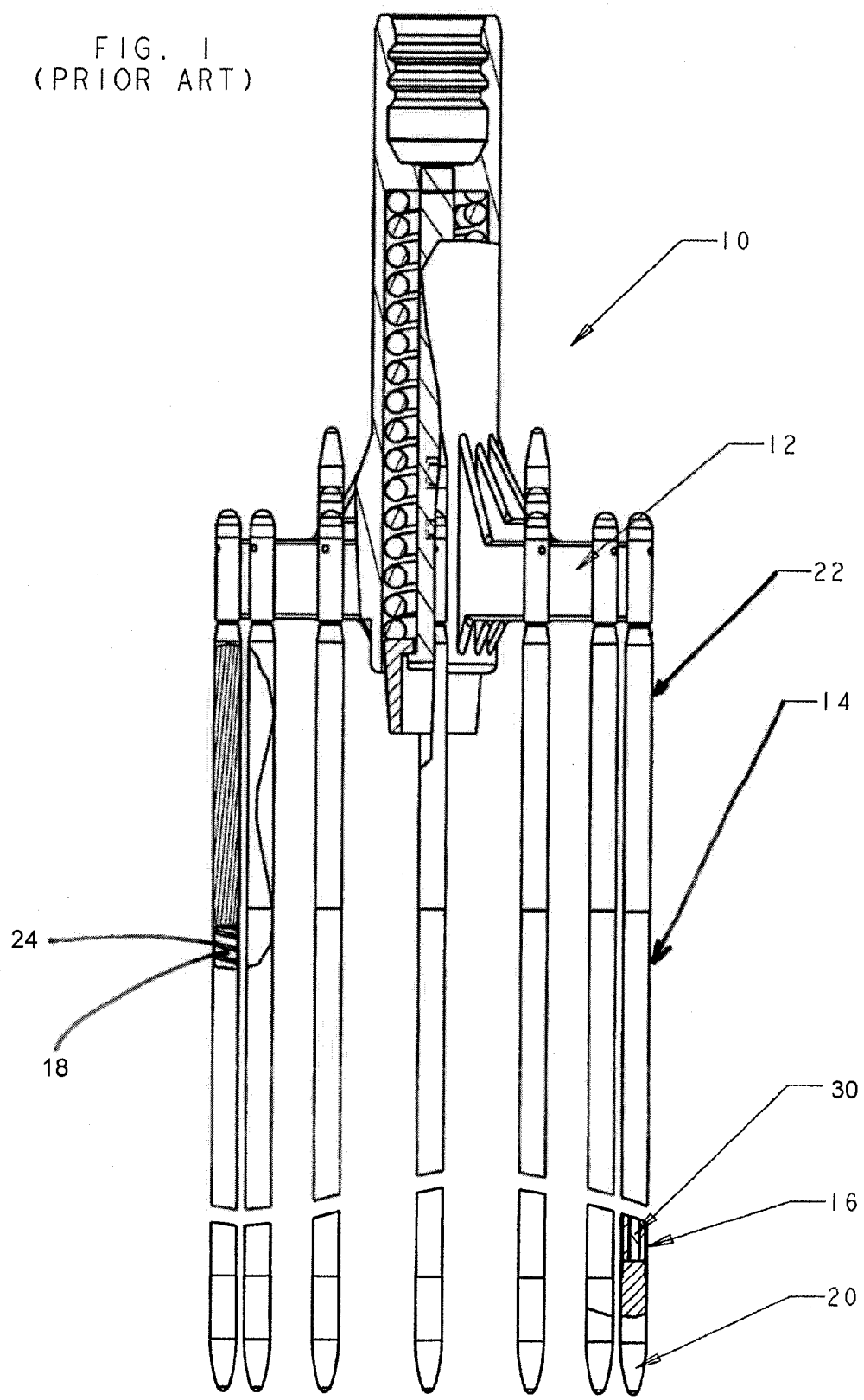
FIG. 1 shows schematically a prior art control rod cluster having a plurality of control rods attached to a spider.
Figure 2:
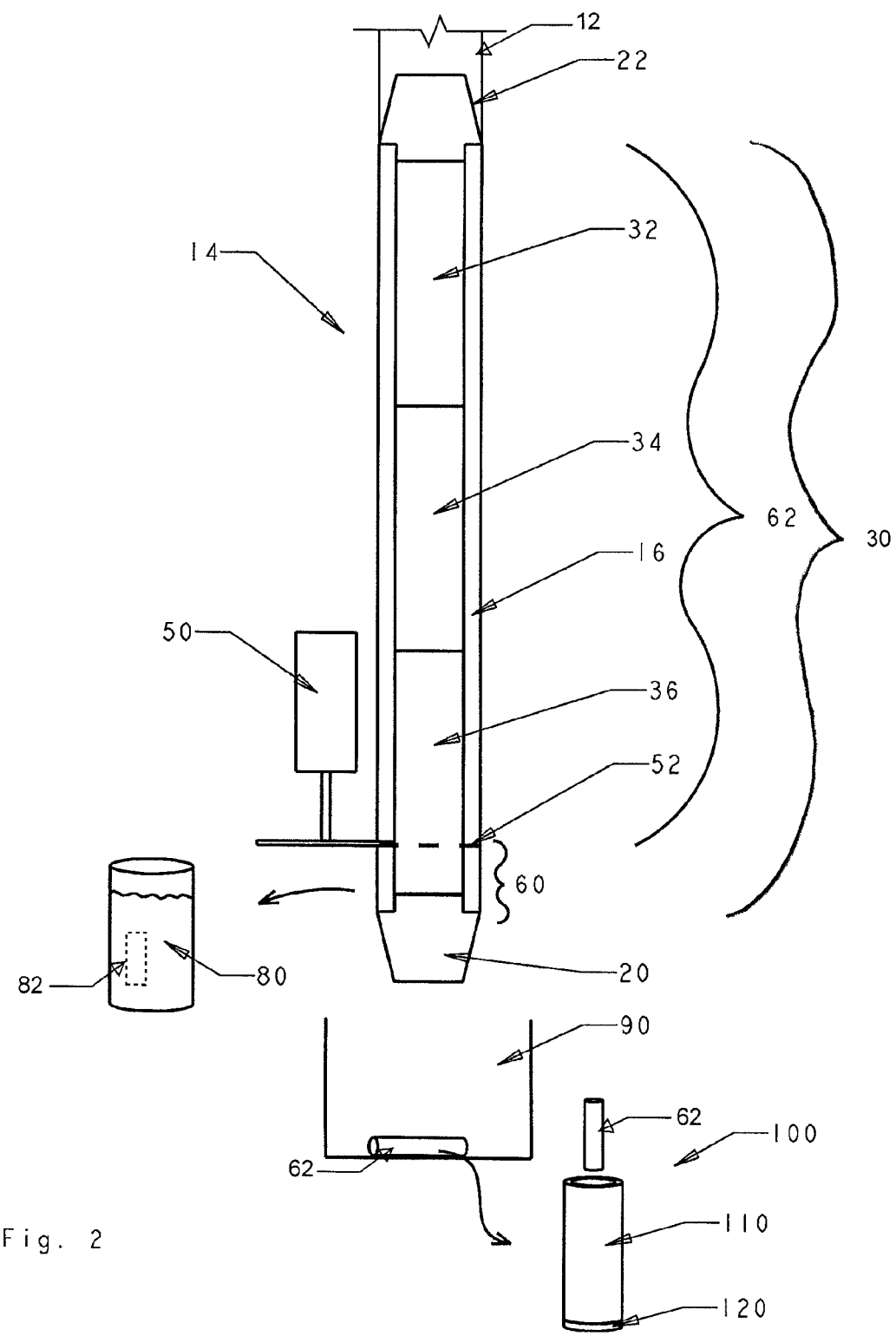
Figure 3:
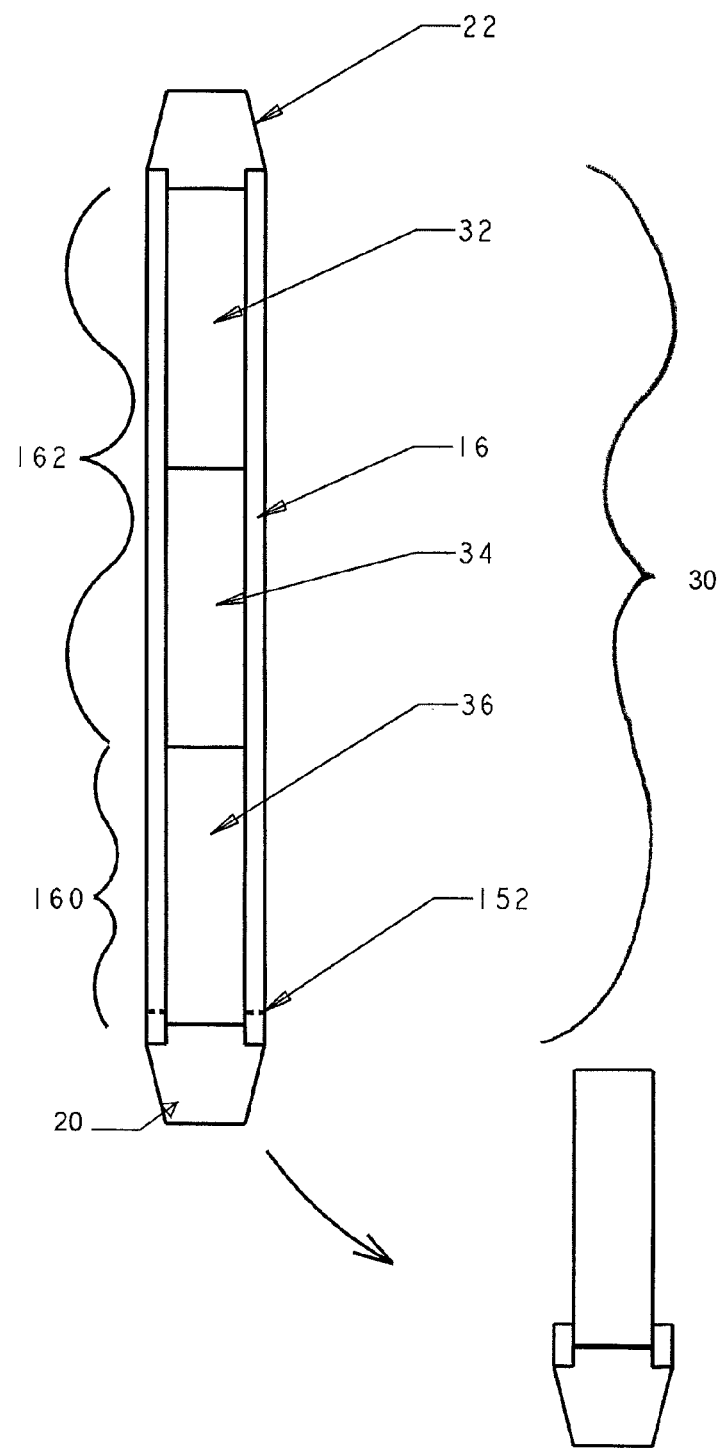
Figure 4A:
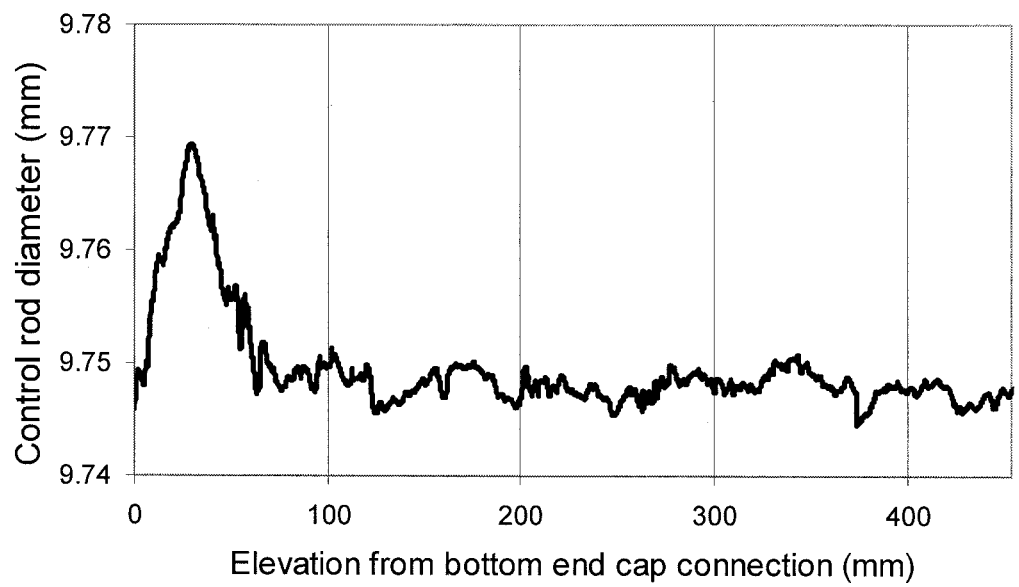
Figure 4B:
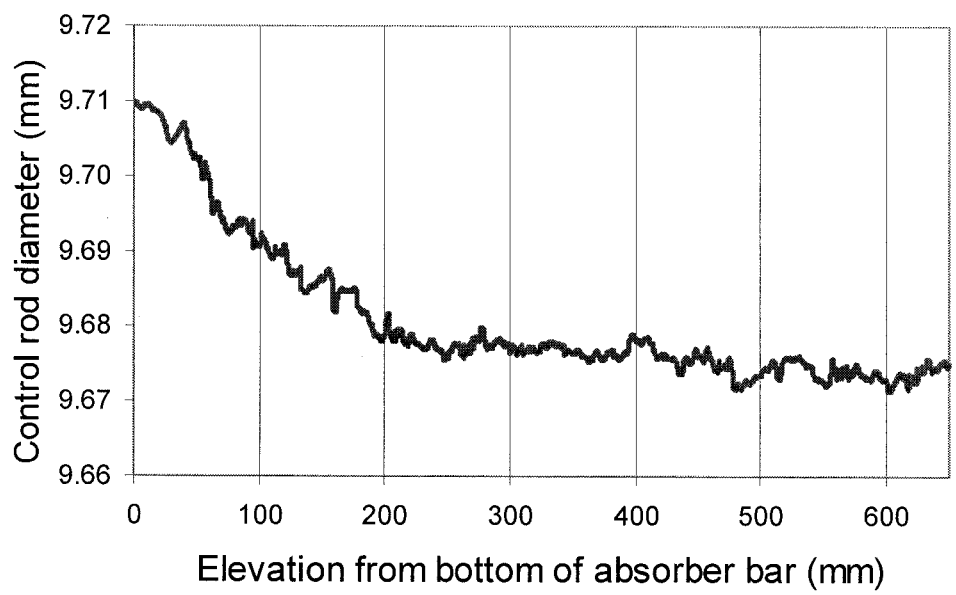
Figure 5A:
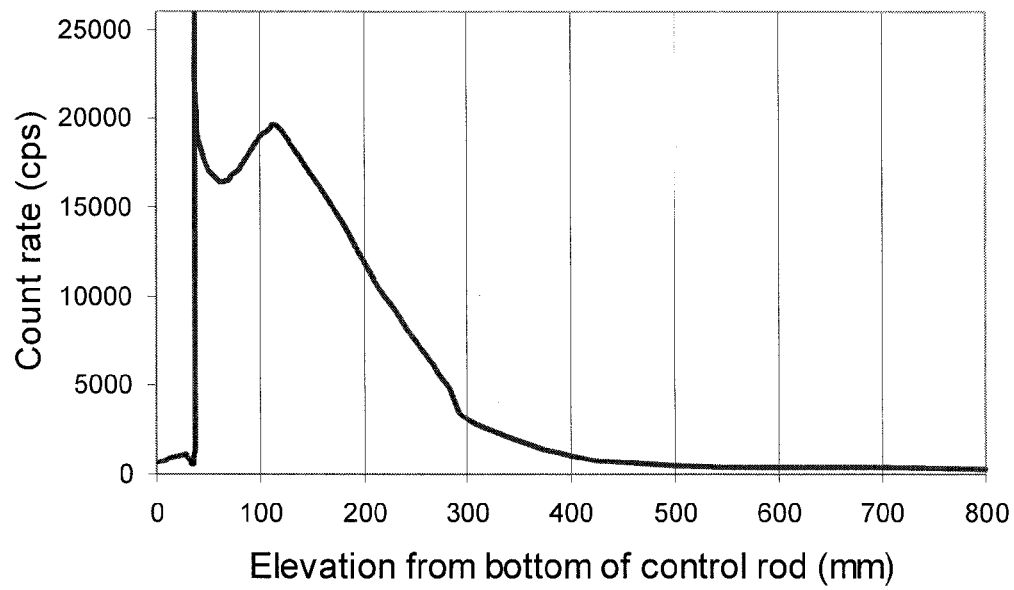
Figure 5B:
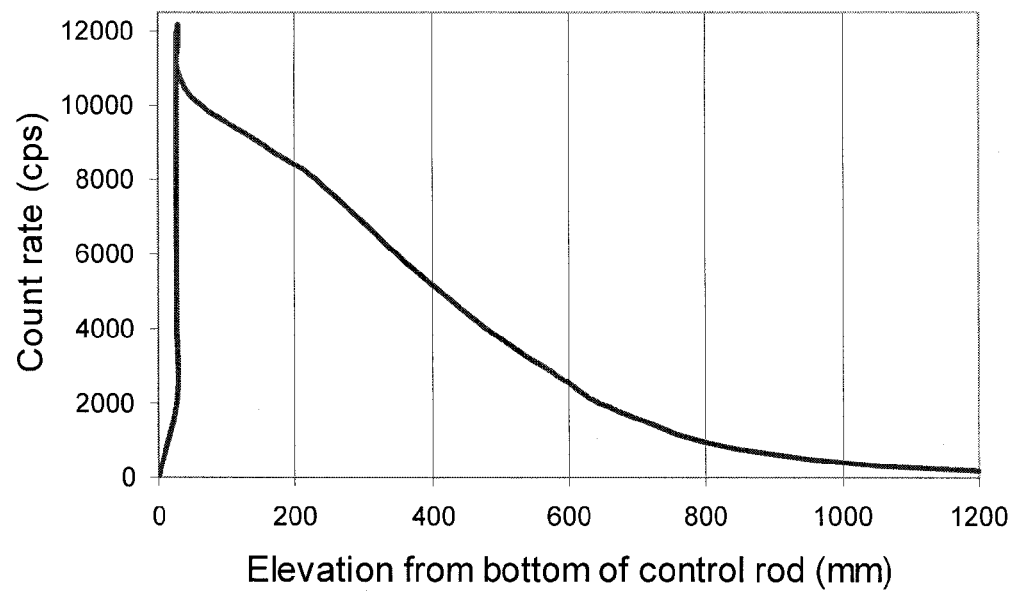
Figure 6:
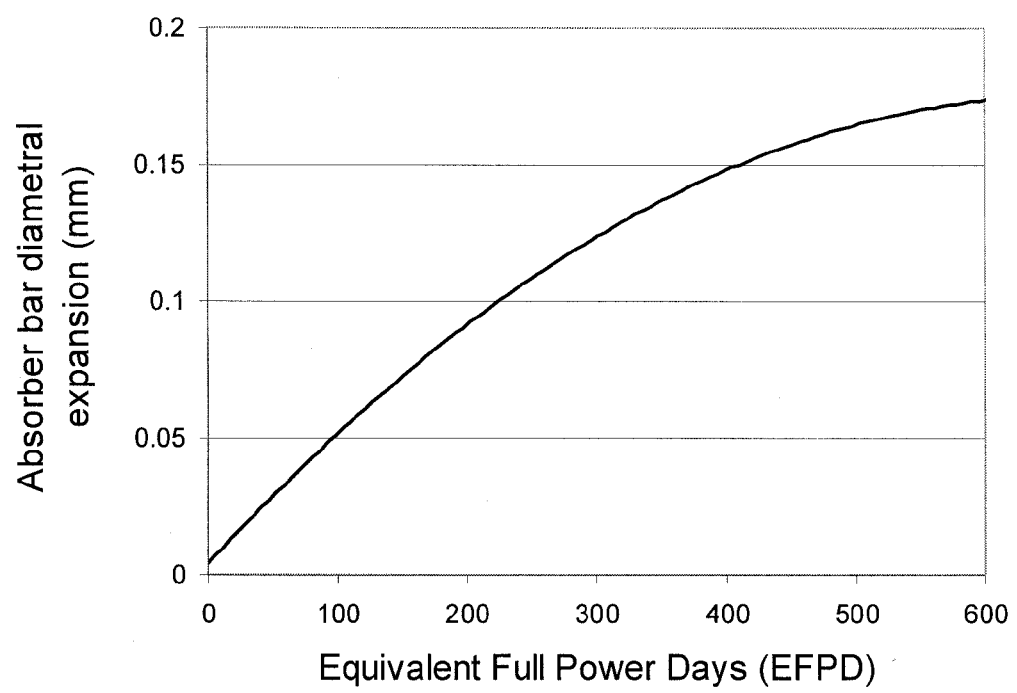

FIG. 2 shows schematically the method of a first embodiment where the control rod is cut through the cladding and the absorber bar material;

FIG. 3 shows schematically the method of a second embodiment where the control rod is cut solely through the cladding;

FIGS. 4A and 4B show a profilometry scan of the diameter of two different used control rods starting at a lowest portion of the control rods;

FIGS. 5A and 5B show a gamma scan of two different used control rods starting at a lowest portion of the control rods; and FIG. 6 shows a graph illustrating an analytical study of diametric expansion at a location along an absorber bar for a duration of use.

DETAILED DESCRIPTION

By sectioning the first section, for example that of a highly radioactive lower end of the absorber bar nearest the bottom end cap 20, the remaining second section of lower radioactivity advantageously can be recycled. Recycling can include: reusing the second section unprocessed in a new control rod; processing the material of the second section into a new control rod; processing the material of the control rod for another use; or storing the second section for a future undetermined use. The AgInCd absorber bars being costly, particularly the precious metals components Ag and In, the cost for manufacturing new control rods can be significantly reduced, or the second section sold or recycled in other ways to reduce overall operating costs. Other uses of this material can be considered, such as use of In for LCD manufacturing, after separating out Ag, In or Cd, for instance by chemical separation.

FIG. 2 shows a first embodiment where the absorber bar 30 of the control rod 14 is constituted of three absorber bars 32, 34, 36 made of AgInCd located between a top end cap 22 and a bottom end cap 20. The control rod 14 can remain attached to the spider 12, or be removed from the spider 12 by a top cut or a physical detachment process, for example as discussed in incorporated-by-reference U.S. Pat. No. 5,889,832.

While the control rod 14 is held from the top either via the spider 12 or a separate gripper, a cutting device 50 can make a cut 52 through both the cladding 16 and the bar 36 to create a first section 60 of absorber bar 30 with a higher radioactivity corresponding to the lowermost portion of the absorber bar, and a second section 62 of absorber bar 30 for recycling. Here second section 62 includes absorber bars 32, 34 and the section of absorber bar 36 above cut 52. However, second section 62 for recycling need not include all of the absorber bar 30 other than first section 60.

Cutting device 50 is shown schematically, but may be for example similar in construction to cutting devices described in U.S. Pat. Nos. 4,650,606, 4,383,394, Korean Patent Application Abstract 2006-0027472, or Japanese Patent Application No. 06-182414, all of which are hereby incorporated by reference herein.

The first section 60, together with bottom end cap 20 and the cladding 16 below cut 52 can be transferred via a bottom gripper to a storage container 82 in the spent fuel pool 80 of the nuclear reactor from which the used control rod 14 was taken, as shown schematically.

Due to diametric expansion of the absorber bar 30 under cumulative effects of creep and swelling of the absorber bar material during nuclear power reactor operation, first section 60 of the absorber bar 30 may have interacted with cladding 16. However, the section of absorber bar 36 above cut 52, and the absorber bars 32, and 34 should not have expanded to create an interaction with the cladding 16. Thus, once cut 52 is made, second section 62 of lower radioactivity may simply fall out of cladding 16. During the cut, the spider 12 or top gripper, together with the bottom gripper, can hold for example both the top of control rod 14 and the bottom of control rod 14 together, for example over a recycling depot 90. After the cut is complete, the bottom gripper can move the first section 60 together with bottom end cap 20 and the cladding 16 below cut 52 to storage container 82 in the spent fuel pool 80, while the section of absorber bar 36 above cut 52 and the absorber bars 34 and 32, i.e. the second section 62, fall into recycling depot 90.

FIG. 4A for example shows how, in one example of a control rod 14, at after about 8 centimeters from the bottom end cap connection, diameter expansion of the control rod substantially ceases. In the example of FIG. 4B, relating to another control rod 14, the expansion of the diameter of the control rod is substantial until about 15 centimeters from the bottom of the absorber bar and ceases at after about 50 centimeters from the bottom of the absorber bar. Cut 52 preferably is above the location where any substantial expansion has occurred, to ensure that the absorber bar 30 above cut 52 can be easily removed from cladding 16. Preferably, the method thus includes determining an expansion of the absorber bar 30 in the cladding 16 at at least one location along the used control rod 14. The location of cut 52 then can be a function of the determined expansion. The location of cut 52 need not to be based on an actual measurement of that specific control rod 14 and may be based on analytical predictions or on a combination of controls and analytical predictions. For example, a profilometry report or an analytical prediction for at least one of the control rods 14 of the cluster 10 may be run, and this report then used for all the control rods 14 of that cluster 10 or even for all the control rods 14 of a corresponding bank of clusters 10 to determine the expansion. However, a report or a prediction can be run for each individual control rod 14 as well.

Depending on the foreseen use of the second section 62 of the absorber bar 30, the location of cut 52 may also be a function of the radioactivity of the absorber bar 30. FIG. 5A shows a gamma scan of a lower part of a control rod 14 from a shutdown bank of cluster 10; after about 40 centimeters, and clearly by 60 centimeters, the radioactivity of the absorber material has leveled off. FIG. 5B shows a gamma scan of a lower part of a control rod 14 from a temperature regulation bank of cluster 10. The radioactivity of the absorber material decreases more gradually and levels off by 100 centimeters. The actual location where the radioactivity levels off will depend on design, type of service for cluster 10, reactor type, and length of decay time. For example, control rods 14 of clusters 10 used in a main control bank of clusters may never be recyclable because the inserted and thus activated part of the absorber bar 30 through its service life may be too long, while other control rods 14 of clusters 10 used in other banks of clusters may solely have tip exposure. The capability of the control rod 14 handling and recycling facility to deal with various levels of activity can also be a factor, and if the capability exists, the cut may be made even before the radioactivity leveling off occurs. Also, the cluster 10 may be shipped to the recycling facility and then the control rods 14 separated from the spider 12 or the control rods 10 may be separated at the reactor plant and then handled by the recycling facility.

Preferably, the cut 52 is made at a location where the second section 62 near the cut 52 will have a radioactivity level of less than or equal to 0.05 Curies/mm. The cut 52 also preferably occurs so that the first section 60 has a length of about 100 cm or less, and most preferably at about 50 cm or less. However, a length of at least 10 cm is desired. These lengths help maximize the amount of recyclable material.

As shown in FIG. 2, the AgInCd absorber bars 32 and 34 and the section of absorber bar 36 above cut 52, i.e. the second section 62, can then be recycled, for example for the same nuclear power plant at a recycling station 100 where a new cladding 110 with a welded new bottom end cap 120 can be provided. Bars 32 and 34 together with another similarly sized bar can be placed in the new cladding 110. The partial section from bar 36 can also be reused, by adding additional material to bar 36, or adding a new bar of the size of the missing material, so that for example four bars may be in the new cladding 110. The partial section from bar 36 may for instance be positioned in the topmost portion in the new cladding 100. A new top end cap can be supplied at recycling station 100 and welded to the new cladding 110 after loading of the spring 24, if any. The new control rod is then connected to a cluster. It should be noted that the second section 62 with cladding 16 above cut 52 may be moved together to recycling station 100 as well, for example by providing a provisional plug after cut 52, or cutting the used control rod 14 while control rod 14 is upside down.

Alternately to reusing second section 62 in a new control rod, the absorber bars 32, 34 and the section of absorber bar 36 above cut 52 may also be stored for later use, or reprocessed.

FIG. 3 shows a second embodiment where the control rod 14 is cut solely through the cladding 16 at a cut 152. When a gripper moves the lower cladding section below cut 152 away, the entire bar 36 may move with it and defines first section 160 of absorber bar 30. Due to creep and swelling and interaction between the lower portion of bar 36 and cladding 16, bar 36, cladding 16 below cut 152 and bottom end cap 20 likely will move as a group. Even if not, bar 36 will remain in the cut section of cladding 16 if held upright. This embodiment is useful solely when a plurality of bars is provided, and may permit a quicker cutting and processing. Bars 32 and 34 can then define second section 162 of absorber bar 30 and be recycled, for example as described with respect to FIG. 2. In addition topmost portion of bar 36 may be cut with another tool positioned in the spent fuel pool or in the recycling station and recycled with bars 32 and 34 or separately.

In addition, with the second embodiment, analytical studies can be used to pre-determine the control rod 14 irradiation and evaluate the corresponding diametric expansion and radioactivity level at at least one location along the absorber bar, for example for a given or expected duration of use as illustrated on FIG. 6. The absorber bars can then be designed as a function of the analytical studies to determine a desired length of absorber bar 36 of the first section 160, and of one or more absorber bars of second section 162. The absorber bars can then be manufactured, shipped and used in a cluster. The cladding can then be sectioned at the end of the use of the control rod 14, and the material of the second section 162 recycled.

It should be noted that the absorber bar material may be in a single bar, or any number of a plurality of bars. Also, while the preferred embodiment describes cutting, the term sectioning can include other ways of sectioning other than cutting.

What is claimed is:

1. A method for recycling AgInCd control rod absorber bar material from a used control rod comprising an AgInCd absorber bar, the method comprising:

sectioning the AgInCd absorber bar from a used control rod into a first section and a second section, the first section having a higher radioactivity than the second section; and recycling the material of the second section of the AgInCd absorber bar, wherein the recycling the material of the second section of the AgInCd absorber bar includes reusing the second section in a new control rod.

2. The method as recited in claim 1 wherein the used control rod includes a cladding, the AgInCd absorber bar being in the cladding, and the sectioning including cutting the cladding.

3. The method as recited in claim 2 wherein the sectioning includes cutting the AgInCd absorber bar and the cladding together.

4. The method as recited in claim 1 wherein the control rod includes a cladding, the AgInCd absorber bar is located in the cladding in a plurality of bars, and the sectioning includes separating a first of the bars from another bar of the bars, the first bar defining the first section.

5. The method as recited in claim 4 wherein a length of the first bar is predetermined prior to use of the first bar in the control rod, the length being a function of analytical studies related to expected irradiation of the first bar during the use.

6. The method as recited in claim 1 wherein the sectioning includes cutting the AgInCd absorber bar into the first section and at least part of the second section.

7. The method as recited in claim 1 wherein the first section includes a lowermost portion of the AgInCd absorber bar of the used control rod.

8. The method as recited in claim 1 further comprising removing the used control rod from a spider prior to the sectioning step.

9. The method as recited in claim 1 wherein the sectioning step occurs while the control rod is attached to a spider.

10. The method as recited in claim 1 further comprising determining a radioactivity level at at least one location along the used control rod, the sectioning being a function of the determined radioactivity level.

11. The method as recited in claim 10 wherein a gamma scan is conducted along at least a portion of the used control rod exposed to a neutron flux in a nuclear reactor core, the sectioning being a function of the determined gamma scan.

12. The method as recited in claim 1 wherein the second section has a radioactivity level of less than or equal to 0.05 Curies/mm.

13. The method as recited in claim 1 wherein the first section has a length of 100 cm or less.

14. The method as recited in claim 13 wherein the wherein the first section has a length of 50 cm or less.

15. The method as recited in claim 14 wherein the wherein the first section has a length of about 10 cm.

16. The method as recited in claim 1 further comprising determining an expansion of the AgInCd absorber bar in a cladding at at least one location along the used control rod, the sectioning being a function of the expansion.

17. A recyclable section of AgInCd control rod absorber bar obtained as the second section in the method as recited in claim 1.

18. The method as recited in claim 1 further comprising providing the first section of the AgInCd absorber bar to a radioactive waste container.

19. The method as recited in claim 18 wherein the radioactive waste container is a storage container in a spent fuel pool.

* * * * *